(12) United States Patent
Vukanti et al.

(10) Patent No.: US 12,287,094 B2
(45) Date of Patent: Apr. 29, 2025

(54) COMBUSTOR WITH DILUTION OPENINGS

(71) Applicant: General Electric Company, Schenectady, NY (US)

(72) Inventors: Perumallu Vukanti, Bengaluru (IN); Varun S. Lakshmanan, Bengaluru (IN); Michael T. Bucaro, Arvada, CO (US); Pradeep Naik, Bengaluru (IN); Steven C. Vise, West Chester, OH (US); Michael A. Benjamin, Cincinnati, OH (US)

(73) Assignee: General Electric Company, Evendale, OH (US)

( * ) Notice: Subject to any disclaimer, the term of this patent is extended or adjusted under 35 U.S.C. 154(b) by 1 day.

(21) Appl. No.: 18/355,449

(22) Filed: Jul. 20, 2023

(65) Prior Publication Data

US 2023/0366550 A1 Nov. 16, 2023

Related U.S. Application Data

(63) Continuation of application No. 17/587,169, filed on Jan. 28, 2022, now Pat. No. 11,747,018.

(60) Provisional application No. 63/296,682, filed on Jan. 5, 2022.

(51) Int. Cl.
*F23R 3/06* (2006.01)
*F23R 3/16* (2006.01)
*F23R 3/28* (2006.01)

(52) U.S. Cl.
CPC .................. *F23R 3/06* (2013.01); *F23R 3/16* (2013.01); *F23R 3/28* (2013.01); *F23R 2900/03044* (2013.01)

(58) Field of Classification Search
CPC ...... F23R 3/10; F23R 3/04; F23R 3/06; F23R 3/16; F23R 3/28; F23R 3/005; F23R 3/14; F23R 3/12; F23R 3/286; F23R 3/38; F23R 3/283; F23R 2900/03044; F23R 2900/03041; F02C 3/04; F02C 3/14
See application file for complete search history.

(56) References Cited

U.S. PATENT DOCUMENTS

| | | | |
|---|---|---|---|
| 2,545,495 A | 3/1951 | Sforzini | |
| 2,601,000 A | 6/1952 | Nerad | |
| 2,974,485 A | 3/1961 | Schiefer | |
| 3,645,095 A * | 2/1972 | Melconian | F23R 3/12 431/352 |

(Continued)

FOREIGN PATENT DOCUMENTS

| | | |
|---|---|---|
| EP | 0724119 A2 | 7/1996 |
| EP | 2685170 A1 | 1/2014 |

(Continued)

*Primary Examiner* — Jason H Duger
(74) *Attorney, Agent, or Firm* — McGarry Bair PC

(57) ABSTRACT

A gas turbine engine including a compressor section and a combustion section in serial flow arrangement along an engine centerline, the combustion section having a combustor liner, a dome wall coupled to the combustor liner, and a dome inlet located in the dome wall, a fuel injector fluidly coupled to the dome inlet, a combustion chamber fluidly coupled to the fuel injector and defined at least in part by the combustor liner and the dome wall, and at least one set of dilution openings located in the dome wall and fluidly coupled to the combustion chamber.

20 Claims, 18 Drawing Sheets

(56) References Cited

U.S. PATENT DOCUMENTS

| | | | |
|---|---|---|---|
| 5,331,805 A * | 7/1994 | Myers | F23R 3/14 60/804 |
| 5,623,827 A | 4/1997 | Monty | |
| 7,389,643 B2 | 6/2008 | Simons et al. | |
| 7,546,737 B2 | 6/2009 | Schumacher et al. | |
| 8,109,099 B2 | 2/2012 | Tu et al. | |
| 9,103,547 B2 | 8/2015 | Eroglu et al. | |
| 9,840,924 B2 | 12/2017 | Hase et al. | |
| 10,408,457 B2 | 9/2019 | Akiyama et al. | |
| 10,823,422 B2 | 11/2020 | Johnson | |
| 2006/0042263 A1 | 3/2006 | Patel et al. | |
| 2009/0188256 A1 | 7/2009 | Woodcock et al. | |
| 2015/0059349 A1 | 3/2015 | Patel et al. | |
| 2015/0113994 A1 * | 4/2015 | Hu | F23R 3/50 60/759 |
| 2017/0248317 A1 | 8/2017 | Hannwacker et al. | |
| 2019/0093891 A1 | 3/2019 | Graham et al. | |
| 2020/0271320 A1 | 8/2020 | Chen | |
| 2021/0247069 A1 | 8/2021 | Iwai et al. | |

FOREIGN PATENT DOCUMENTS

| | | | |
|---|---|---|---|
| EP | 3473818 B1 | 7/2021 | |
| GB | 2029957 A | 3/1980 | |
| GB | 2581385 B1 | 8/2020 | |

\* cited by examiner

COMBUSTOR WITH DILUTION OPENINGS

CROSS-REFERENCE TO RELATED APPLICATIONS

This application is a continuation application of U.S. patent application Ser. No. 17/587,169, filed Jan. 28, 2022, now U.S. Pat. No. 11,747,018, issued on Sep. 5, 2023, which is incorporated herein by reference in its entirety.

TECHNICAL FIELD

The present subject matter relates generally to a combustor with dilution openings, more specifically to a combustor having a set of dilution openings located in a dome wall.

BACKGROUND

Turbine engines are driven by a flow of combustion gases passing through the engine to rotate a multitude of turbine blades. A combustor can be provided within the gas turbine engine and is fluidly coupled with a turbine into which the combusted gases flow.

The use of hydrocarbon fuels in the combustor of a gas turbine engine is known. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally harmful toxins, such as nitrogen oxide and nitrogen dioxide (collectively called $NO_x$), CO, UHC (e.g., methane and volatile organic compounds that contribute to the formation of atmospheric ozone), and other oxides, including oxides of sulfur (e.g., $SO_2$ and $SO_3$).

One solution to reducing the environmentally undesirable compounds is to use fuels other than hydrocarbons. Hydrogen or hydrogen mixed with another element or compound can be used for combustion, however hydrogen or a hydrogen mixed fuel can result in a higher flame temperature than traditional fuels. That is, hydrogen or a hydrogen mixed fuel typically have a wider flammable range and a faster burning speed when compared to traditional fuels such as petroleum-based fuels, or petroleum and synthetic fuel blends.

Standards stemming from air pollution concerns worldwide regulate the emission of oxides of nitrogen ($NO_x$), unburned hydrocarbons (UHC), and carbon monoxide (CO) generated as a result of the gas turbine engine operation. In particular, nitrogen oxide ($NO_x$) is formed within the combustor as a result of high combustor flame temperatures during operation. It is desirable to decrease $NO_x$ emissions while still maintaining desirable efficiencies by regulating the profile and or pattern within the combustor.

DETAILED DESCRIPTION

Figure 1:
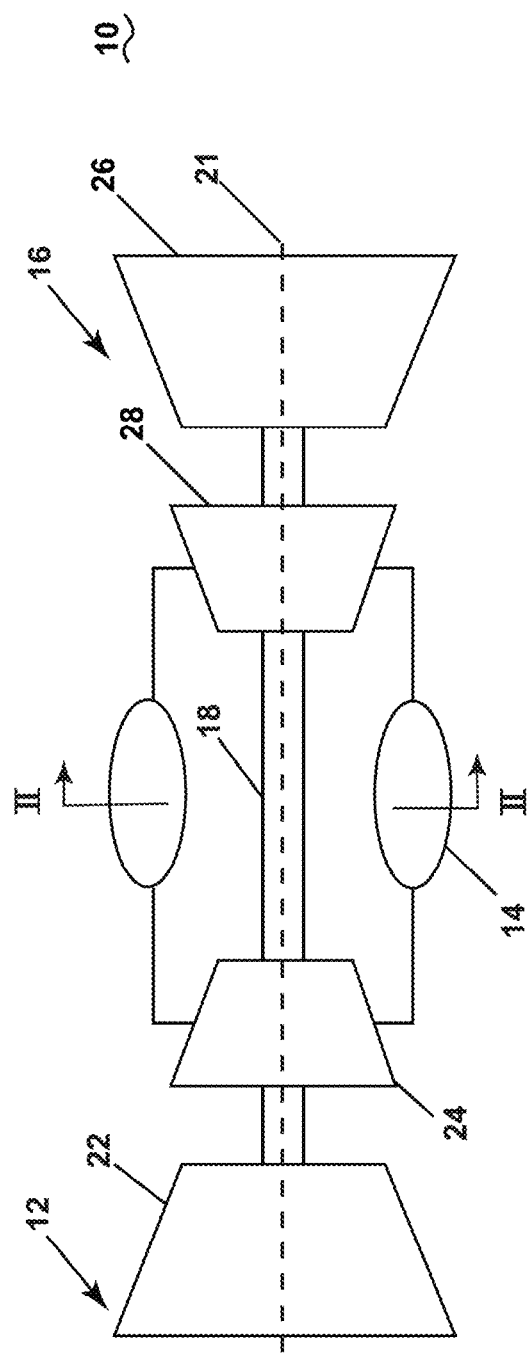
FIG. 1 is a schematic of a gas turbine engine.

Aspects of the disclosure described herein are directed to a combustor, and in particular a combustor liner having dilution openings. For purposes of illustration, the present disclosure will be described with respect to a gas turbine engine. It will be understood, however, that aspects of the disclosure described herein are not so limited and that a combustor as described herein can be implemented in engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluid communication" means that a fluid is capable of making the connection between the areas specified.

Additionally, as used herein, the terms "radial" or "radially" refer to a direction away from a common center. For example, in the overall context of a gas turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16 in serial flow arrangement. A drive shaft 18 rotationally couples the compressor and turbine sections 12, 16, such that rotation of one affects the rotation of the other, and defines a rotational axis or engine centerline 21 for the gas turbine engine 10.

The compressor section 12 can include a low-pressure (LP) compressor 22, and a high-pressure (HP) compressor 24 serially fluidly coupled to one another. The turbine section 16 can include an LP turbine 26, and an HP turbine 28 serially fluidly coupled to one another. The drive shaft 18 can operatively couple the LP compressor 22, the HP compressor 24, the LP turbine 26 and the HP turbine 28 together. Alternatively, the drive shaft 18 can include an LP drive shaft (not illustrated) and an HP drive shaft (not illustrated). The LP drive shaft can couple the LP compressor 22 to the LP turbine 26, and the HP drive shaft can couple the HP compressor 24 to the HP turbine 28. An LP spool can be defined as the combination of the LP compressor 22, the LP turbine 26, and the LP drive shaft such that the rotation of the LP turbine 26 can apply a driving force to the LP drive shaft, which in turn can rotate the LP compressor 22. An HP spool can be defined as the combination of the HP compressor 24, the HP turbine 28, and the HP drive shaft such that the rotation of the HP turbine 28 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a casing which can extend circumferentially about the gas turbine engine 10. It will be appreciated that the representation of the compressor section 12 is merely schematic and that there can be any number of stages. Further, it is contemplated, that there can be any other number of components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section can be mounted to the casing in a circumferential manner. It is noted that there can be any number of blades, vanes and turbine stages as the illustrated turbine section is merely a schematic representation. Further, it is contemplated, that there can be any other number of components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 28 at a downstream end of the combustion section 14.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 28, which drives the HP compressor 24. The combustion gases are discharged into the LP turbine 26, which extracts additional work to drive the LP compressor 22, and the exhaust gas is ultimately discharged from the gas turbine engine 10 via an exhaust section (not illustrated) downstream of the turbine section 16. The driving of the LP turbine 26 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10.

Figure 2:
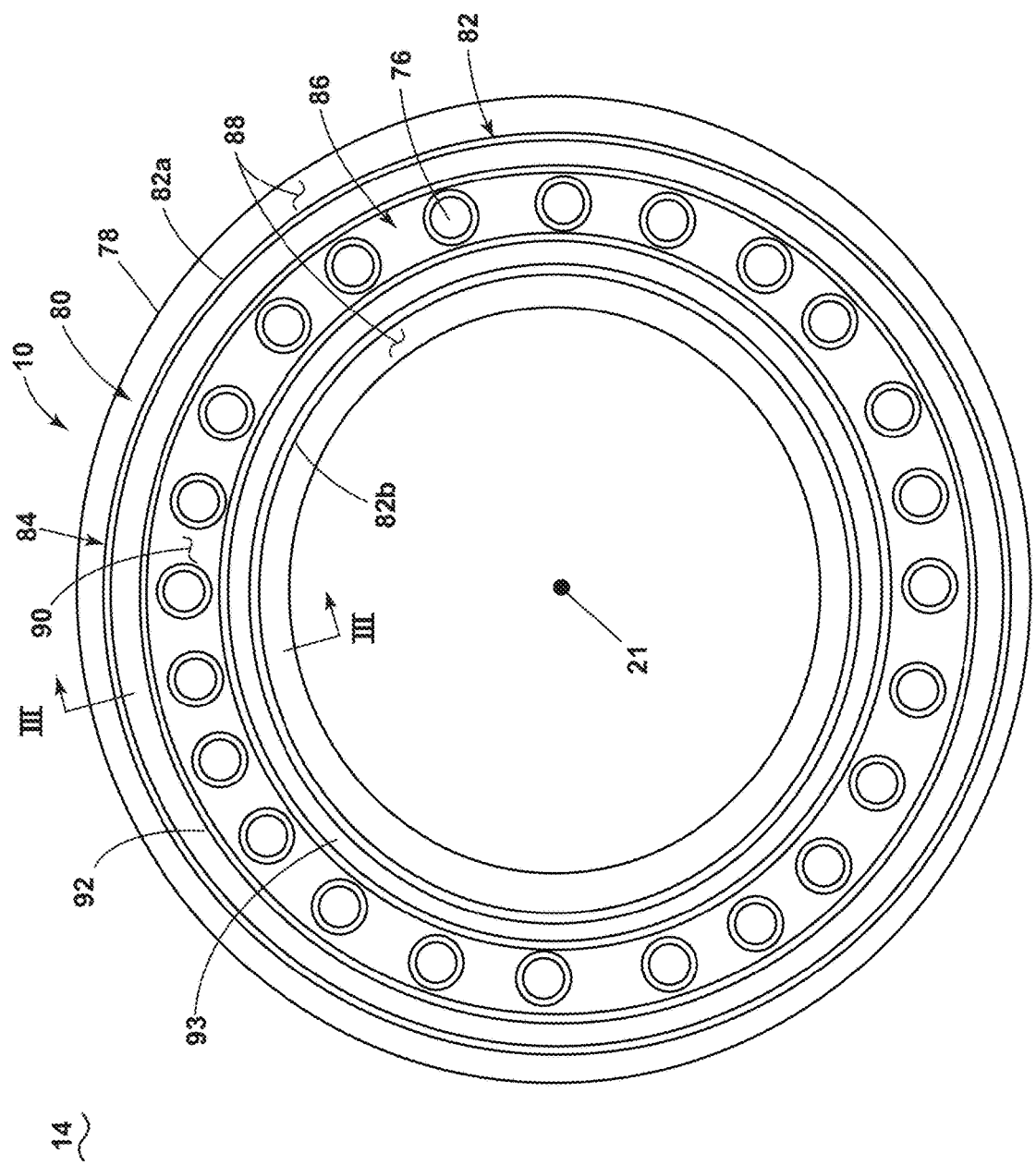
FIG. 2 depicts a cross-section view along line II-II of FIG. 1 of a combustion section of the gas turbine engine.

FIG. 2 depicts a cross-section view of the combustion section 14 along line II-II of FIG. 1. The combustion section 14 can include an annular arrangement of fuel injectors 76 disposed around the engine centerline 21 of the gas turbine engine 10. Each of the fuel injectors 76 can be connected to a combustor 80. It should be appreciated that the annular arrangement of fuel injectors can be one or multiple fuel injectors and one or more of the fuel injectors 76 can have different characteristics. The combustor 80 can have a can, can-annular, or annular arrangement depending on the type of engine in which the combustor 80 is located. In a non-limiting example, an annular arrangement is illustrated and disposed within a casing 78. The combustor 80 is defined by a combustor liner 82 including an outer annular combustor liner 82a and an inner annular combustor liner 82b concentric with respect to each other and annular about the engine centerline 21. A dome assembly 84 including a dome wall 90 together with the combustor liner 82 can define a combustion chamber 86 annular about the engine centerline 21. A first and second set of dilution openings 92, 93 can be located in the dome wall 90. The first and second set of dilution opening 92, 93 can be annularly arranged about the engine centerline 21. The first and second set of dilution openings 92, 93 can be annular dilution openings defining a continuous annulus about the engine centerline 21 as illustrated. At least one fuel injector 76, illustrated as multiple fuel injectors annularly arranged about the engine centerline 21, is fluidly coupled to the combustion chamber 86. A compressed air passageway 88 can be defined at least in part by both the combustor liner 82 and the casing 78.

Figure 3:
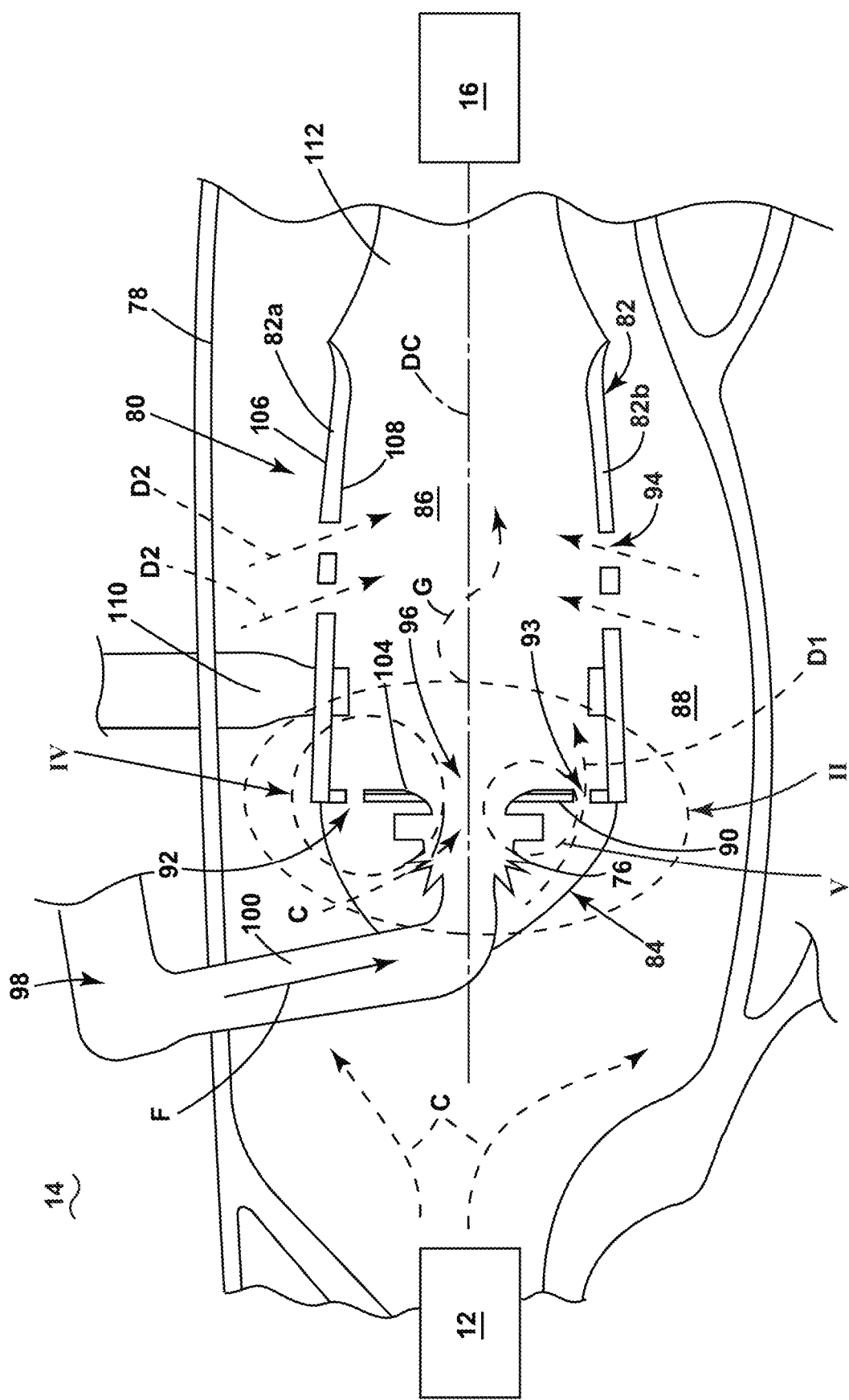
FIG. 3 is a cross-sectional view of a combustor in the combustion section formed from a combustor liner having multiple sets of dilution openings according to an aspect of the disclosure herein.

FIG. 3 depicts a cross-section view taken along line III-III of FIG. 1 illustrating the combustion section 14. A third set of dilution openings 94 can be located in the combustor liner 82, connecting the compressed air passageway 88 and the combustor 80.

The fuel injector 76 can be coupled to and disposed within the dome assembly 84 upstream of a flare cone 104 to define a fuel/air mixture outlet 96. The fuel/air mixture outlet can define a dome inlet 96 such that the fuel/air mixture outlet and dome inlet are one in the same and fluidly coupled to each other at the flare cone 104. The fuel injector 76 can include a fuel inlet 98 that can be adapted to receive a flow of fuel (F) and a linear fuel passageway 100 extending between the fuel inlet 98 and the fuel/air mixture outlet/dome inlet 96. The first set of dilution openings 92 can define a swirler provided at the fuel/air mixture outlet/dome inlet 96 to swirl incoming compressed air (C) in proximity to fuel (F) exiting the fuel injector 76 and provide a homogeneous mixture of air and fuel entering the combustor 80.

Both the inner and outer combustor liners 82a, 82b can have an outer surface 106 and an inner surface 108 at least partially defining the combustion chamber 86. The combustor liner 82 can be made of one continuous monolithic portion or be multiple monolithic portions assembled together to define the inner and outer combustor liners 82a, 82b. By way of non-limiting example, the outer surface 106 can define a first piece of the combustor liner 82 while the inner surface 108 can define a second piece of the combustor liner 82 that when assembled together form the combustor liner 82. As described herein, the combustor liner 82 includes the third set of dilution openings 94. It is further contemplated that the combustor liner 82 can be any type of combustor liner 82, including but not limited to a double walled liner or a tile liner. An igniter 110 can be provided at the combustor liner 82 and fluidly coupled to the combustion chamber 86, at any location, by way of non-limiting example upstream of the third set of dilution openings 94.

During operation, compressed air (C) can flow from the compressor section 72 to the combustor 80 through the dome assembly 84. The first set of dilution openings 92 in the dome wall 90 allow passage of at least a portion of the compressed air (C), the portion defining a first dilution airflow (D1), from the dome assembly 84 to the combustion chamber 86.

Additionally, compressed air (C) can flow from the compressor section 72 to the combustor 80 through the compressed air passageway 88. The third set of dilution openings 94 in the combustor liner 82 allow passage of at least a portion of the compressed air (C), the portion defining a second dilution airflow (D2), from the compressed air passageway 88 to the combustion chamber 86.

Some compressed air (C) can be mixed with the fuel (F) and upon entering the combustor 80, the mixture is ignited within the combustion chamber 86 by one or more igniters 110 to generate combustion gas (G). The combustion gas (G) is mixed using the dilution airflow (D1, D2) supplied through the sets of dilution openings 92, 93, 94, and mixes within the combustion chamber 86, after which the combustion gas (G) flows through a combustor outlet 112 and exits into the turbine section 74.

Figure 4:
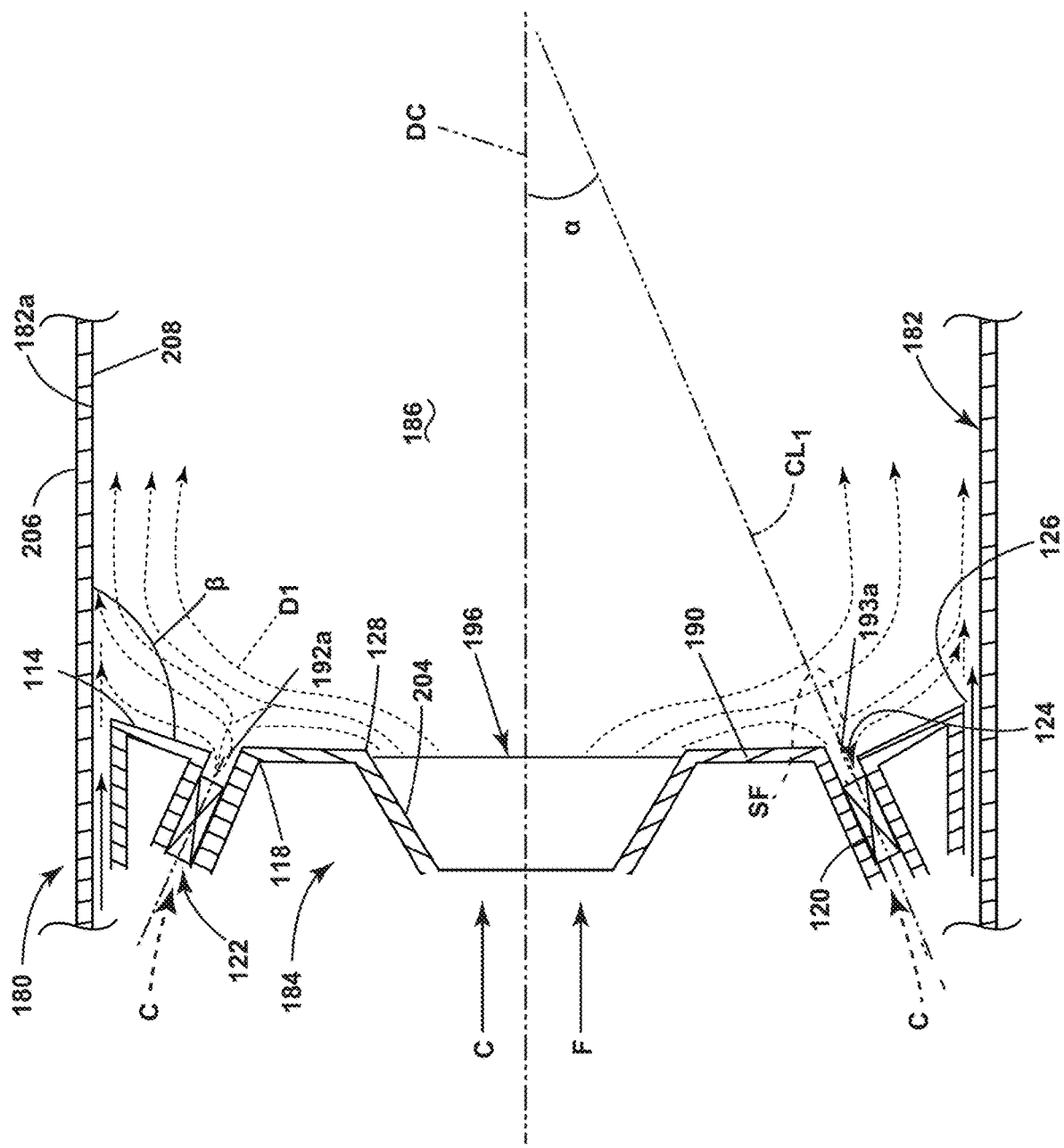
FIG. 4 is a schematic of a variation of a portion II having a first set of dilution openings for the combustor from FIG. 3 according to an aspect of the disclosure herein.

FIG. 4 is a schematic of a portion of a combustor 180, a variation of the combustor 80, according to another aspect of the disclosure herein. The combustor 180 is substantially similar to a portion III of combustor 80, therefore, like parts will be identified with like numerals increased by 100. It should be understood that the description of the like parts of the combustor 80 applies to the combustor 180 unless otherwise noted.

The combustor 180 has a combustion chamber 186 that is defined by a combustor liner 182 and a dome assembly 184 including a dome wall 190. A flare cone 204 can define a fuel/air mixture outlet/dome inlet 196 and a dome centerline (DC) extending from a geometric center of the flare cone 204. The dome centerline (DC) can be angled with respect to the engine centerline 21 and extend in a direction substantially parallel to the engine centerline 21 (FIG. 2). The dome wall 190 can extend radially away from the dome centerline (DC). A first and second set of dilution openings 192a, 193a can be located in the dome wall 190 between the fuel/air mixture outlet/dome inlet 196 and the combustor liner 182. The first and second set of dilution openings 192a, 193a can extend between a dilution inlet 122 and a dilution outlet 124 and include at least one vane 120 disposed between the dilution inlet 122 and the dilution outlet 124. In one aspect the first and second set of dilution openings 192a, 193a can be annular about the engine centerline 21 forming concentric circles (FIG. 1) where the first set of dilution openings 192a circumscribe the second set of dilution openings 193a. There can be any number of vanes 120 oriented circumferentially about the engine centerline 21. The at least one vane 120 can be an axial flow or a radial flow vane or a combination of an axial flow and a radial flow vane. An axial flow vane moves an airflow in an axial direction, along a primarily longitudinal axis extending parallel to the dome centerline (DC). A radial flow vane moves air in a radial direction, along a primarily vertical axis extending perpendicular to the dome centerline (DC). A pair of vanes 120 can define a nozzle having first dilution centerline (CL1) angled toward the dome centerline (DC) of the combustion chamber 186. The first dilution centerline (CL1) can make a dilution angle ($\alpha$) with the dome centerline (DC) that is less than 90°. In some implementations the dilution angle ($\alpha$) can be less than or equal to 60°.

The dome wall 190 can extend approximately perpendicularly (within 5%) to the dome centerline (DC) from the flare cone 204 toward the outlet 124 of the first set of dilution openings 192 to define a flat portion 116. At least one cooling hole 126 can be located where the dome wall 190 meets the combustion liner 182. The dome wall 190 between the outlet 124 and the at least one cooling hole 126 can be angled toward the combustion liner 182 away from the fuel/air mixture outlet/dome inlet 196 to define a conic portion 114 with an obtuse angle ($\beta$) between the dome wall 190 and the combustion liner 182. The obtuse angle ($\beta$) is greater than 90°. In some implementations the obtuse angle ($\beta$) can be greater than 130°. The conic portion 114 can meet the flat portion 116 at a first junction 118. The flare cone 204 can meet the dome wall 190 at a second junction 128.

During operation, the at least one vane 120 can provide a swirl flow (SF) to the combustion chamber 186. Additionally, the at least one cooling hole 126 can provide additional compressed air (C) for cooling an interior surface 208 of the combustion liner 182.

Figure 5:
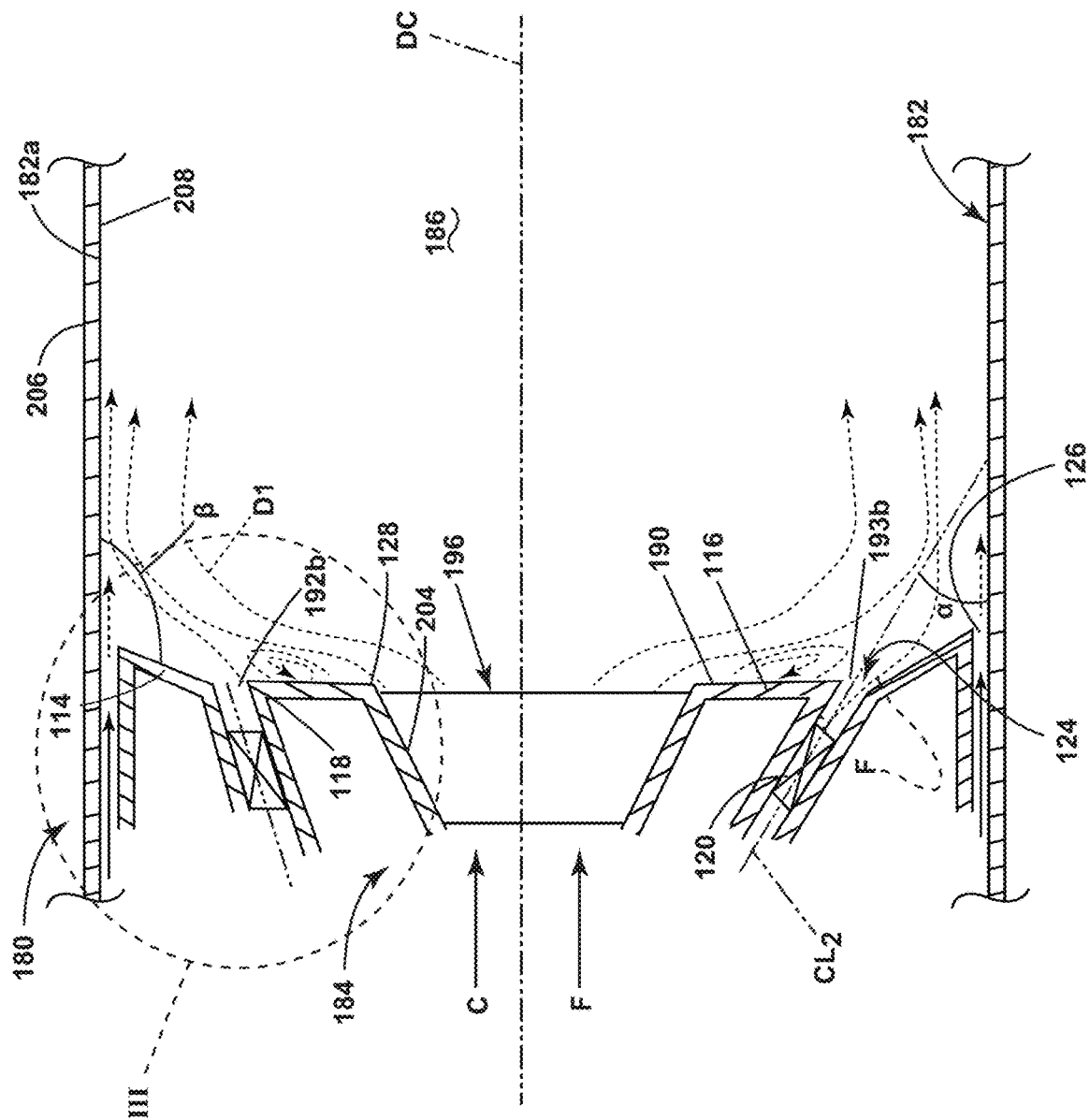
FIG. 5 is a variation of the first set of dilution openings from FIG. 3 according to an aspect of the disclosure herein.

FIG. 5 is a schematic of the portion II of combustor 80 of FIG. 3 for a variation of combustor 180. A variation of the first and second set of dilution openings 192a, 193a of FIG. 4 is illustrated as a first and second set of dilution openings 192b, 193b located in the dome wall 190 between the fuel/air mixture outlet/dome inlet 196 and the combustor liner 182. In this variation a second dilution centerline (CL2) is angled away from the dome centerline (DC) of the combustion chamber 186. The second dilution centerline (CL2) can still make a dilution angle ($\alpha$) with the dome wall 190 that is less than 90°. In some implementations the dilution angle ($\alpha$) can be less than or equal to 60°. In this particular variation, however, the outlet 124 points towards the combustor liner 182. Therefore, it should be understood, that the dilution angle ($\alpha$) can vary between −60 and 60 degrees.

Figure 6:
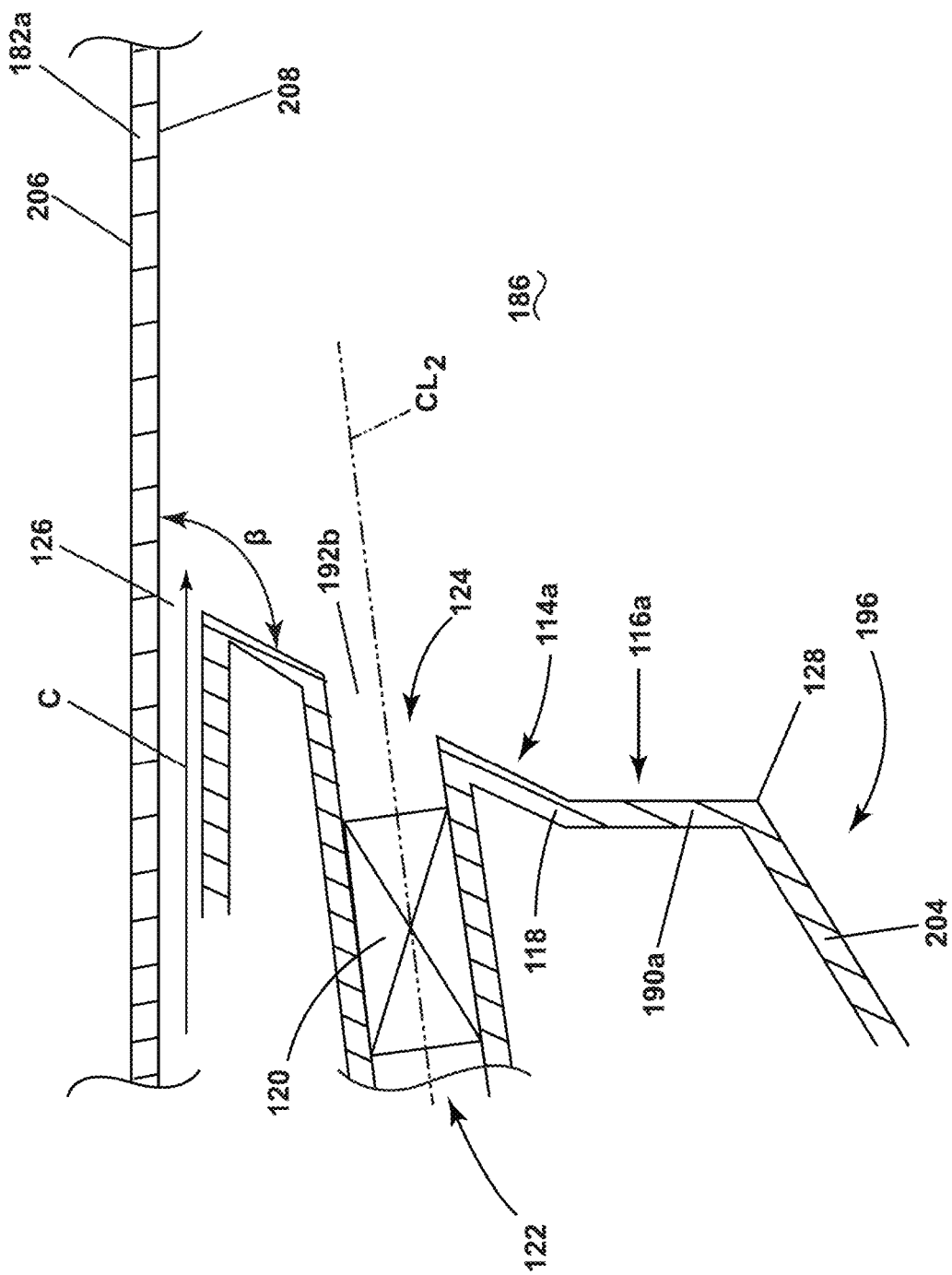
FIG. 6 is a variation of a portion III from FIG. 5 with a dome wall according to an aspect of the disclosure herein.

FIG. 6 illustrates a variation of the dome wall 190 according to another aspect of the disclosure herein, by way of non-limiting example in the region III of FIG. 5. A dome wall 190a can be angled to define a conic portion 114a around the outlet 124 of the first set of dilution openings 192b. The dome wall 190a can include a flat portion 116a extending radially from the second junction 128. The first junction 118 can define a beginning of the conic portion 114a. The conic portion 114a can extend radially from the first junction 118 toward the combustor liner 182 to form the obtuse angle (0).

Figure 7:
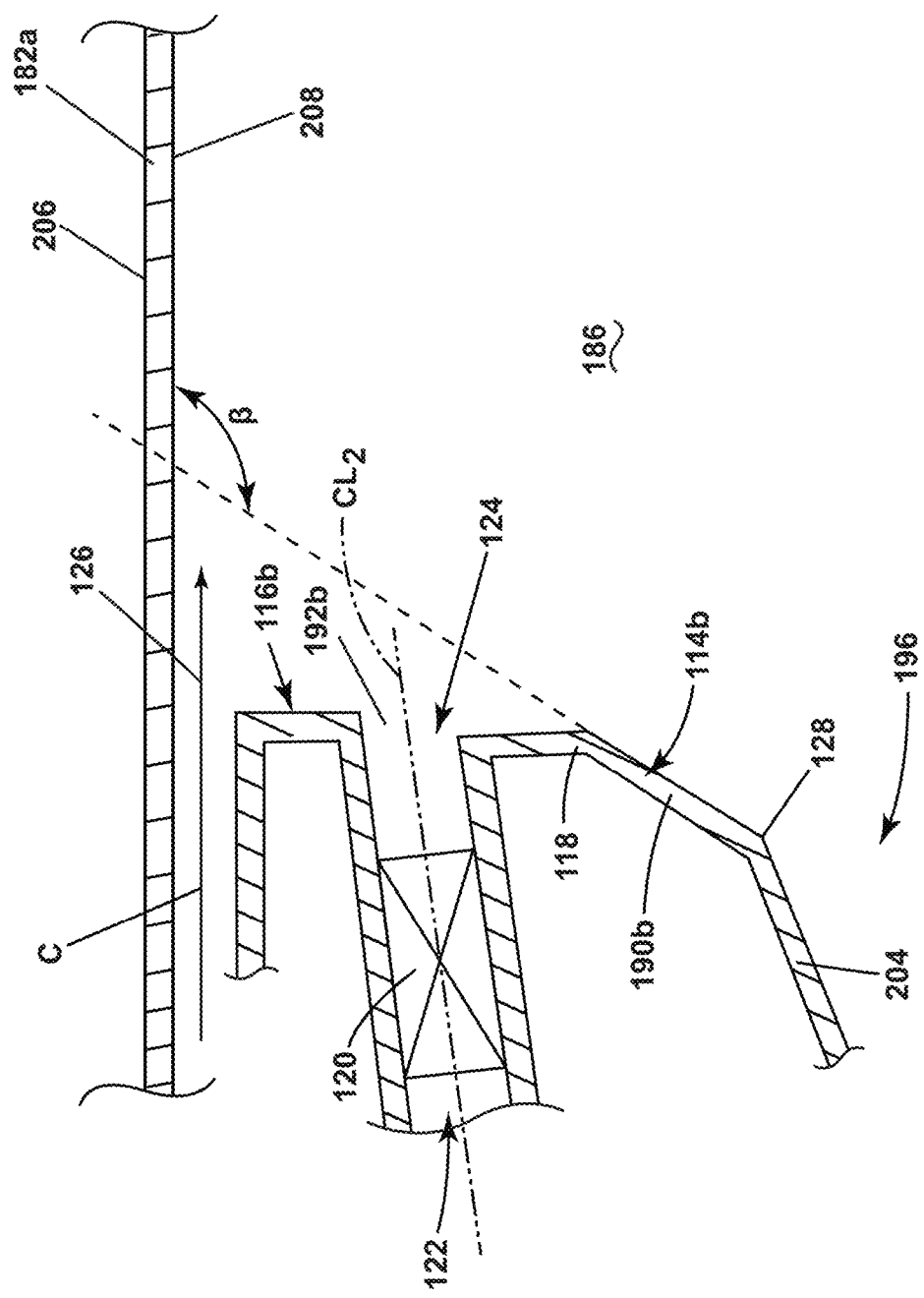
FIG. 7 is another variation of the portion III from FIG. 5 with a dome wall according to another aspect of the disclosure herein.

FIG. 7 illustrates another variation of the dome wall 190 according to another aspect of the disclosure herein, by way of non-limiting example in the region III of FIG. 5. A dome wall 190b can be angled to define a conic portion 114b extending radially from the second junction 128 toward the combustor liner 182 to form the obtuse angle (0). The first junction 118 can still be located between the outlet 124 and the end 128 of the flare cone 204. The dome wall 190b can include a flat portion 116b extending radially from the first junction 118 around the outlet 124 of the first set of dilution openings 192b.

While illustrated as having the same cross-section, it should be understood that the dome wall 190, 190a, 190b, the conic portion 114, 114a, 114b, the flare cone 204 and any other portion of the dome assembly 184 can be formed of materially separate parts. By "meet", the parts described herein simply overlap at the first and second junctions 118, 128 described herein. While a junction can mean joined physically together, it can also mean overlapping at that point in space.

Figure 8:
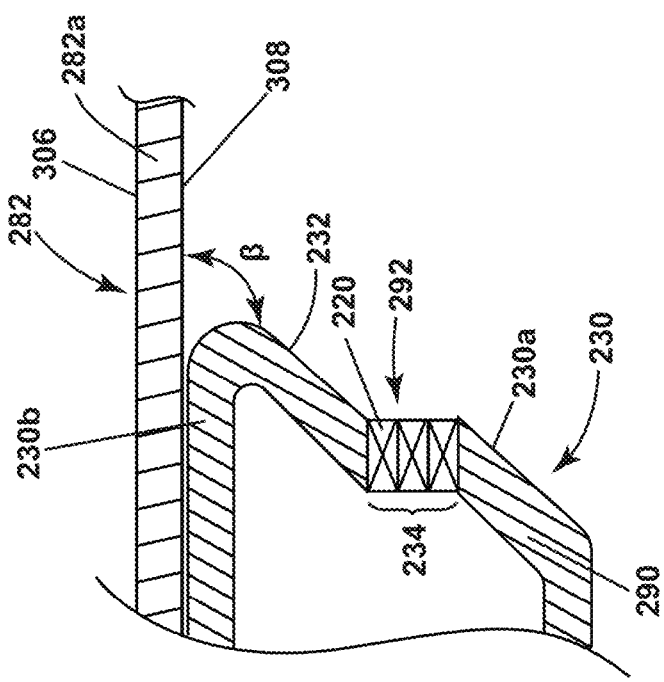
FIG. 8 is a schematic of a variation of a portion IV from FIG. 3 with a first set of dilution openings according to an aspect of the disclosure herein.

FIG. 8 is a schematic of a first set of dilution openings 292 located, by way of non-limiting example in the region IV of FIG. 3 of combustor 80. The first set of dilution openings 292 are substantially similar to the first set of dilution openings 92, therefore, like parts will be identified with like numerals increased by 200. It should be understood that the description of the like parts of the first set of dilution openings 92 applies to the first set of dilution openings 292 unless otherwise noted.

A dome wall 290 can define a deflector 230 having two parts an inner section 230a and an outer section 230b. The outer section 230b can have a face 232 located axially forward of the inner section 230a. The first set of dilution openings 292 can be disposed between the inner and outer sections 230a, 230b. The first set of dilution openings can include multiple rows 234 of vanes 220 arranged radially with respect to each other.

Figure 9:
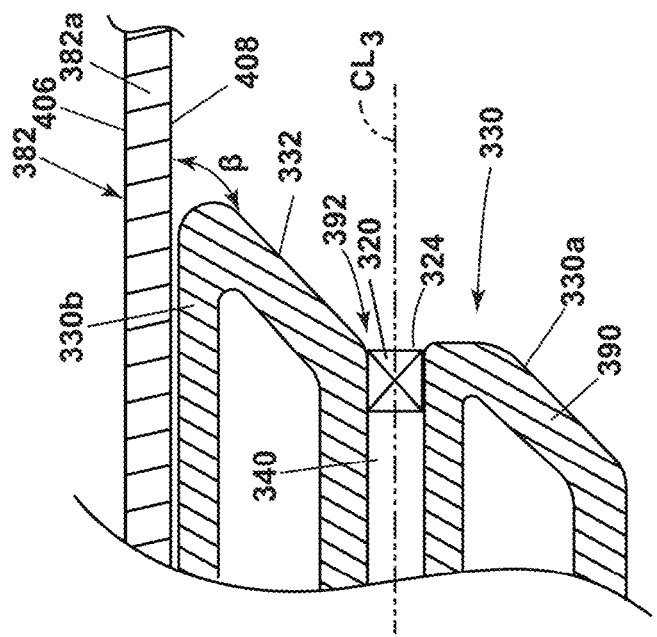
FIG. 9 is a schematic of a variation of the portion IV from FIG. 3 with a first set of dilution openings according to another aspect of the disclosure herein.

FIG. 9 is a schematic of a first set of dilution openings 392 located, by way of non-limiting example in the region IV of FIG. 3 of combustor 80. The first set of dilution openings 392 are substantially similar to the first set of dilution openings 92, therefore, like parts will be identified with like numerals increased by 300. It should be understood that the description of the like parts of the first set of dilution openings 92 applies to the first set of dilution openings 392 unless otherwise noted.

A dome wall 390 can define a deflector 330 having two parts an inner section 330a and an outer section 330b. The outer section 330b can have a face 332 located axially forward of the inner section 330a. The first set of dilution openings 392 can be disposed between the inner and outer sections 330a, 330b. An axially extending passage 340 defining a third dilution centerline (CL3) can terminate in an outlet 324 on the deflector 330. The axially extending passage 340 can separate the inner section 330a from the outer sections 330b. The axially extending passage 340 can define at least one of the openings in the first set of dilution openings 392. The axial extending passage 340 can include at least one vane 320 disposed within the passage 340 proximate to the outlet 324.

Figure 10:
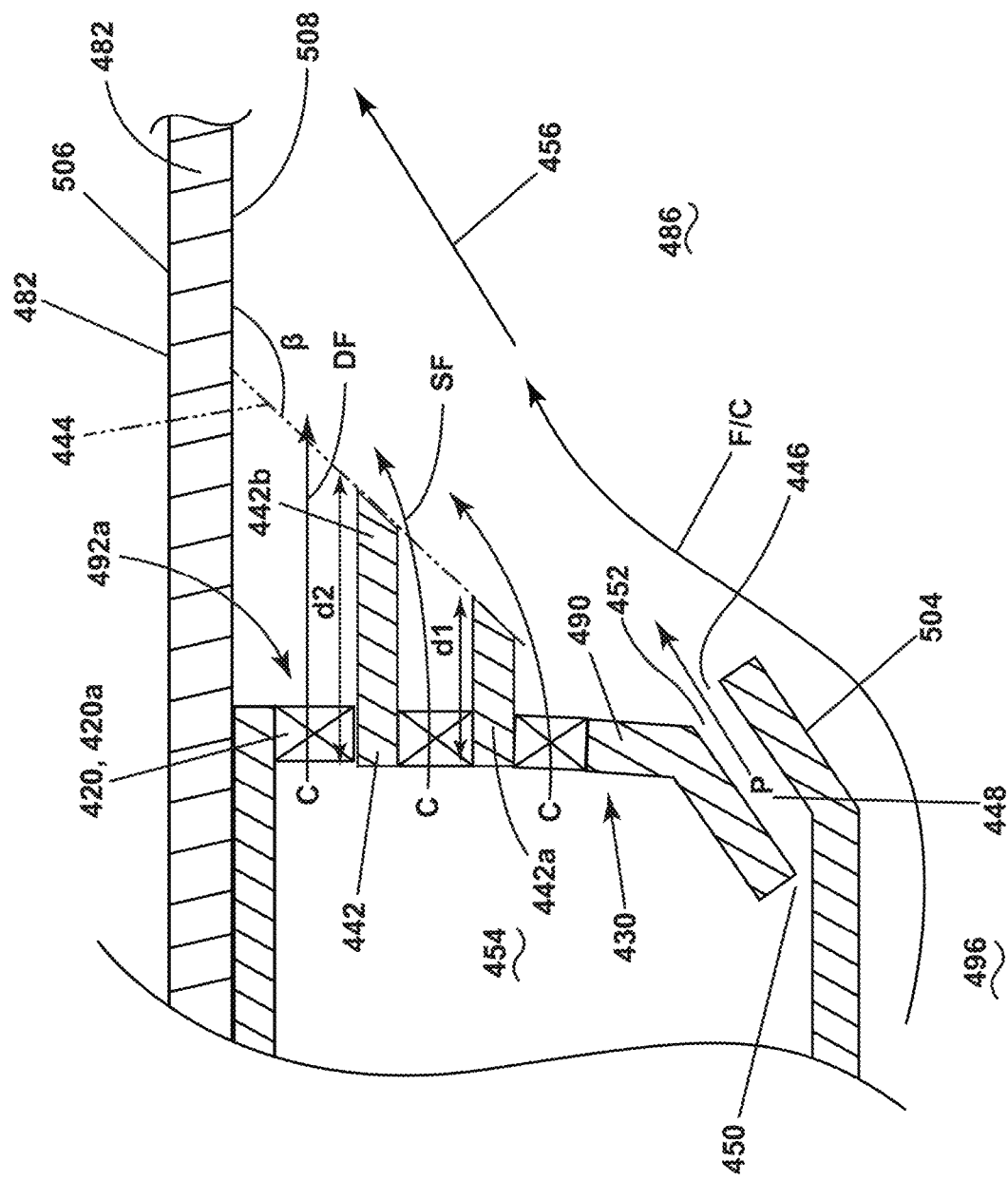
FIG. 10 is a schematic of a variation of the portion IV from FIG. 3 with a first set of dilution openings according to an aspect of the disclosure herein.

FIG. 10 is a schematic of a first set of dilution openings 492a located, by way of non-limiting example in the region IV of FIG. 3 of combustor 80. The first set of dilution openings 492a are substantially similar to the first set of dilution openings 92, therefore, like parts will be identified with like numerals increased by 400. It should be understood that the description of the like parts of the first set of dilution openings 92 applies to the first set of dilution openings 492a unless otherwise noted.

A dome wall 490 can define a deflector 430. The deflector 430 can include multiple axial deflectors 442, illustrated as two axial deflectors. The axial deflectors 442 can extend axially away from the dome wall 490. The first set of dilution openings 492a can include, by way of non-limiting example three dilution openings radially disposed and separated by the axial deflectors 442. In other words, the first set of dilution openings 492a can be disposed within the dome wall 490 in a staggered relationship with the axial deflectors 442. Each of the first set of dilution openings 492a can be flush with the dome wall 490. The first set of dilution openings 492a can include at least one vane 420, or any number of vanes 420 oriented circumferentially about the flare cone 504. While illustrated as axial flow vanes 420a, the at least one vane 420 can be axial or radial or a combination of axial and radial flow vanes.

A first axial deflector 442a can extend axially downstream from the dome wall 490 a first distance (d1). A second axial deflector 442b can be located radially outward from the first axial deflector 442a. The second axial deflector 442b can extend axially downstream from the dome wall 490 a second distance (d2) where the second distance (d2) is greater than the first distance (d1). A straight-line 444 connecting distal ends of the first and second axial deflectors 442a, 442b can be drawn to intersect with a combustor liner 482 to form an obtuse angle ($\beta$).

A third set of dilution openings 446 can be located around the flare cone 504. The third set of dilution openings 446 can include a purge passage 448 extending between a purge inlet 450 and a purge outlet 452. An inlet plenum 454 can be fluidly coupled to the first set of dilution openings 492a and the purge passage 448 at the purge inlet 450.

During operation compressed air (C) can flow through the first set of dilution openings 492a to form a dilution flow (DF). In some implementations the flow through the first set of dilution openings 492a can form a swirl flow (SF). Any particles remaining in the inlet plenum 454 can be removed via the third set of dilution openings 446 as a purged airflow (P). A fuel/air (F/C) mixture can flow along a path illustrated by arrows 456. The purge flow (P) is further utilized for cooling of the flare cone 504 and to ensure that the fuel/air (F/C) mixture does not attach to a hot side of the dome wall 490. The path illustrated by arrows 456 can be controlled by a combination of the dilution flow (DF), the swirl flow (SF) and the purged airflow (P).

Figure 11:
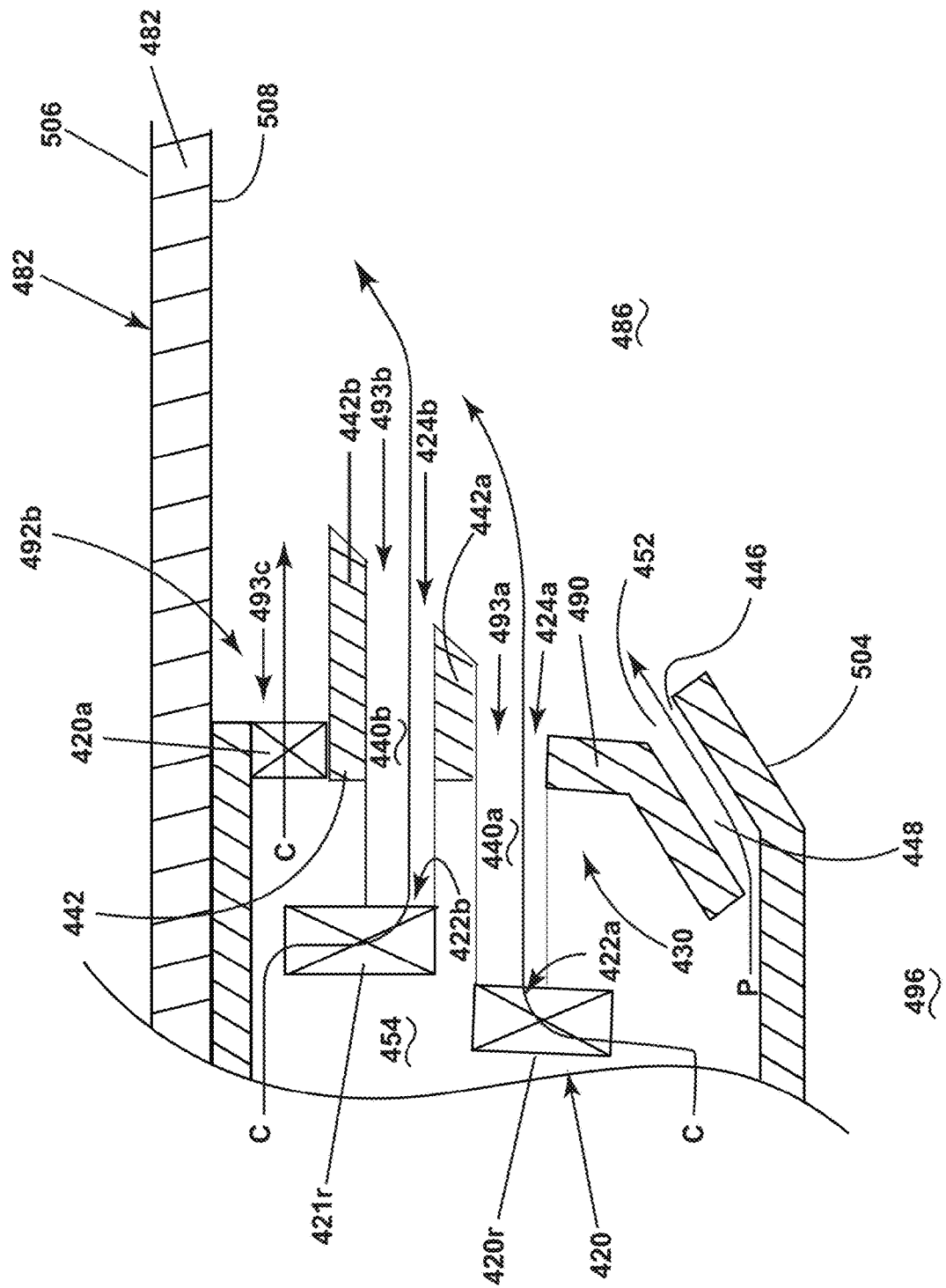
FIG. 11 is a schematic of a variation of the first set of dilution openings from FIG. 10, also located in the region IV of FIG. 3, according to another aspect of the disclosure herein.

FIG. 11 illustrates a variation of the first set of dilution openings 492a of FIG. 10, numerically indicated as a first set of dilution openings 492b located in the dome wall 490 between a fuel/air mixture outlet/dome inlet 496 and the combustor liner 482. Some part numbers have been removed for clarity.

The first set of dilution openings 492b can be defined at least in part by at least one vane 420, or any number of vanes 420 oriented circumferentially about the flare cone 504. The first set of dilution openings 492b can include an inner opening 493a, an outer opening 493c and a middle opening 493b disposed between the inner and outer openings 493a, 493c. The outer opening 493c can be located proximate the combustor liner 482 and include an axial flow vane 420a.

A pair of radial flow vanes, a first and a second radial flow vane 420r, 421r, can be disposed axially upstream of the dome wall 490 in fluid communication with the inlet plenum 454. A first axially extending passage 440a can extend from a first dilution inlet 422a at the first radial flow vane 420r to a first dilution outlet 424a at the dome wall 490. The first radial flow vane 420r can extend from the first dilution inlet 422a radially inward, in a direction away from the combustor liner 482. While illustrated as extending radially inward, it should be understood that the first radial flow vane 420r can extend radially outward, or that both the first and second radial flow vanes 420r, 421r can extend radially outward.

A second axially extending passage 440b can extend from a second dilution inlet 422b at the second radial flow vane 421r to a second outlet 424b at the distal ends of the first and second axial deflectors 442a, 442b. The second radial flow vane 421r can extend from the second dilution inlet 422b radially outward, in a direction toward the combustor liner 482. While illustrated as extending radially outward, it should be understood that the second radial flow vane 421r can extend radially inward, or that both the first and second radial flow vanes 420r, 421r can extend radially inward.

In addition to or along with the flow described previously herein, during operation compressed air (C) can travel through the first axial flow vane 420a and exhaust proximate the combustor liner 482. Compressed air (C) proximate the fuel/air mixture outlet/dome inlet 496 can be radially drawn into first axially extending passage 440a by the first radial flow vane 420r. The second radial flow vane 421r can mirror the first radial flow vane 420r by drawing compressed air (C) from proximate the combustor liner 482 into the second axially extending passage 440b, or vice versa depending on the vane orientation. The radial flow vanes 420r, 421r can be recessed from the dome wall 490 to give sufficient axial length for flow to develop before exiting the dome wall 490.

Figure 12:
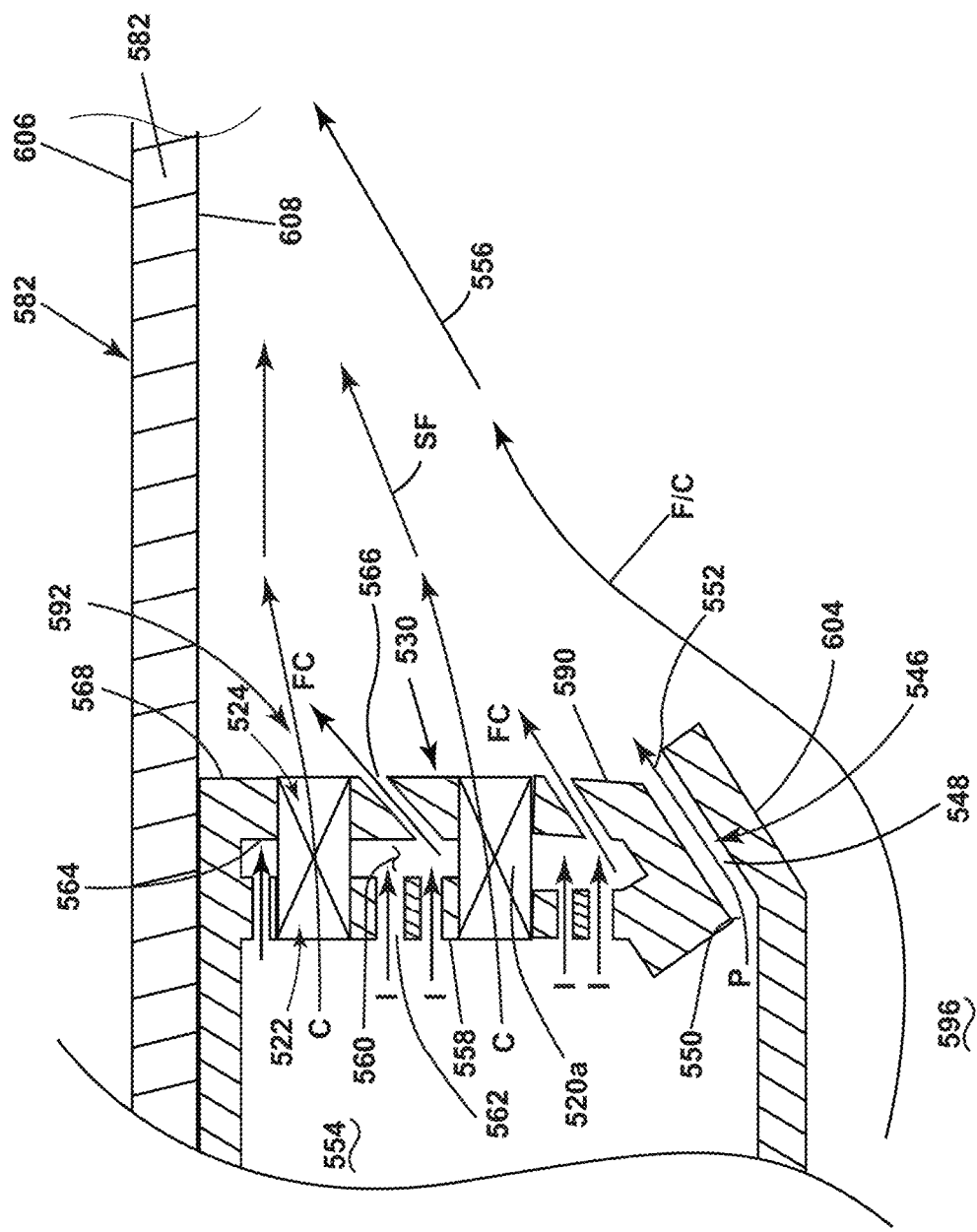
FIG. 12 is a schematic of a variation of the portion IV from FIG. 3 with a first set of dilution openings according to yet another aspect of the disclosure herein.

FIG. 12 is a schematic of a first set of dilution openings 592 located, by way of non-limiting example in the region IV of FIG. 3 of combustor 80. The first set of dilution openings 592 are substantially similar to the first set of dilution openings 92, therefore, like parts will be identified with like numerals increased by 500. It should be understood that the description of the like parts of the first set of dilution openings 92 applies to the first set of dilution openings 592 unless otherwise noted.

A dome wall 590 can include a deflector 530 and an impingement wall 558 spaced apart to define an intermediate plenum 560. The first set of dilution openings 592 can include, by way of non-limiting example two dilution openings radially disposed within the dome wall 590. The first set of dilution openings 592 can be defined at least in part by an axial flow vane 520a extending between a dilution inlet 522 at the impingement wall 558 and a dilution outlet 524 at the deflector 530.

A third set of dilution openings 546 can be located around a flare cone 604. The third set of dilution openings 546 can include a purge passage 548 extending between a purge inlet 550 and a purge outlet 552. An inlet plenum 554 can be fluidly coupled to the first set of dilution openings 592 and the purge passage 548 at the purge inlet 550.

A set of impingement holes 562 can be located in the impingement wall 558 surrounding the dilution inlets 522 of the first set of dilution openings 592. The impingement holes 562 can exhaust into the impingement plenum 560 for impingement onto an inner surface 564 of the deflector 530.

A set of film cooling holes 566 can be located in the deflector 530. The set of film cooling holes 566 can fluidly couple the impingement plenum 560 to an exterior surface 568 of the deflector 530. It is further contemplated that the set of film cooling holes fluidly couple one of or a combination of the inlet plenum 554, impingement plenum 560, or the first set of dilution openings 592 to the exterior surface 568.

It should be understood that while the cross-sectional view illustrated shows all the holes/openings in the same plane, each of the holes/openings can be distributed circumferentially about a fuel/air mixture outlet/dome inlet 596 in any suitable manner.

In addition to or along with the flow described previously herein, during operation compressed air (C) can pass through the set of impingement holes 562 and impinge onto the inner surface 564 of the deflector 530 to define an impingement flow (I). Compressed air (C) can pass through the set of film cooling holes 566 and exhaust onto the exterior surface 568 to define a film cooling flow (FC).

Figure 13:
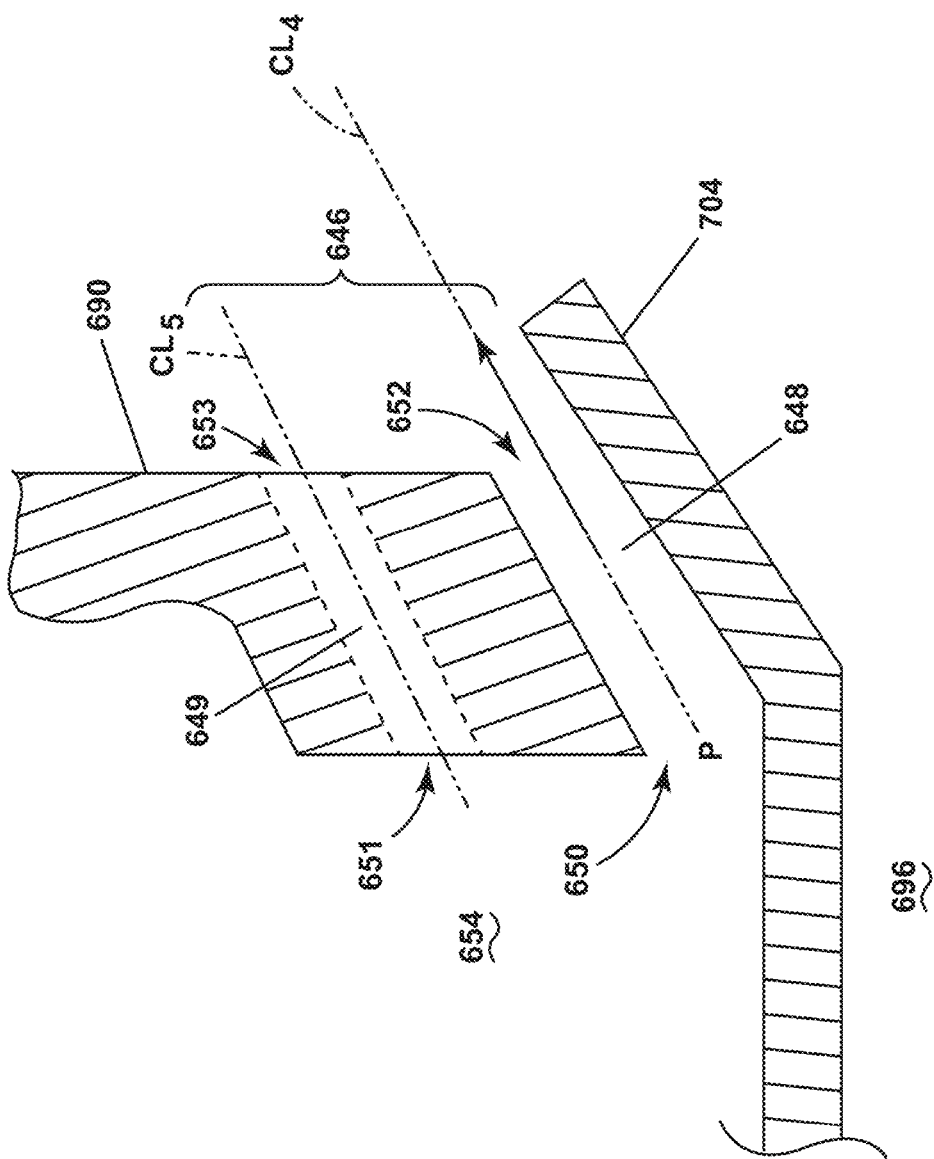
FIG. 13 is a schematic of a variation a portion V of FIG. 3 with a flare cone and a dome wall according to an aspect of the disclosure herein.

Turning to FIG. 13, illustrated is a schematic of an enlarged view of a variation of the flare cone 104 and dome wall 90 arrangement for combustor 80 located in portion V of FIG. 3, according to another aspect of the disclosure herein. A flare cone 704 and a dome wall 690 are substantially similar to the flare cone 104 and dome wall 90 of combustor 80, therefore like parts will be identified with like numerals increased by 600. It should be understood that the description of the like parts of the flare cone 104 and dome wall 90 applies to the flare cone 704 and the dome wall 690 unless otherwise noted.

The flare cone 704 can define a fuel/air mixture outlet/dome inlet 696. A third set of dilution openings 646, similar to the third set of dilution openings previously described herein, can be located around the flare cone 704. The third set of dilution openings 646 can include a purge passage 648 extending between a purge inlet 650 and a purge outlet 652 parallel to and proximate the flare cone 704. The purge passage 648 can define a fourth centerline (CL4) angled away from fuel/air mixture outlet/dome inlet 696.

The third set of dilution openings 646 can further include a peripheral dilution passage 649 extending between a dilution inlet 651 and a dilution outlet 653 radially outward the purge passage 648. The peripheral passage 649 can define a fifth dilution centerline (CL5) angled away from the fuel/air mixture outlet/dome inlet 696. The fourth and fifth dilution centerlines (CL4, CL5) can be parallel to each other, or within 20% of parallel to each other. An inlet plenum 654 can be fluidly coupled to the third set of dilution openings 646 at the inlets 650, 651.

Figure 14:
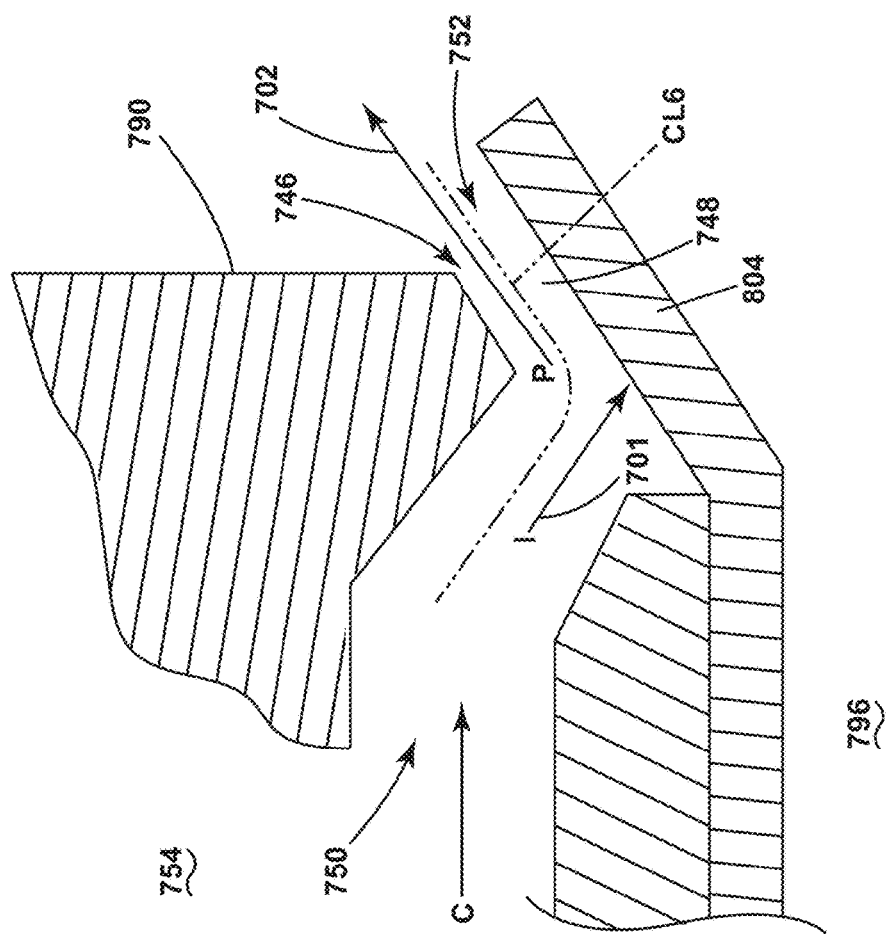
FIG. 14 is a schematic of a variation the portion V of FIG. 3 with a flare cone and a dome wall according to another aspect of the disclosure herein.

Turning to FIG. 14, illustrated is a schematic of an enlarged view of a variation of the flare cone 104 and dome wall 90 arrangement for combustor 80 located in portion V of FIG. 3, according to another aspect of the disclosure herein. A flare cone 804 and a dome wall 790 are substantially similar to the flare cone 104 and dome wall 90 of combustor 80 of FIG. 3, therefore like parts will be identified with like numerals increased by 700. It should be understood that the description of the like parts of the flare cone 104 and dome wall 90 applies to the flare cone 804 and the dome wall 790 unless otherwise noted.

The flare cone 804 can define a fuel/air mixture outlet/dome inlet 796. A third set of dilution openings 746, similar to the third set of dilution openings previously described herein, can be located around the flare cone 804. The third set of dilution openings 746 can include a purge passage 748 extending between a purge inlet 750 and a purge outlet 752 parallel to and proximate the flare cone 804. The purge passage 748 can define a sixth dilution centerline (CL6) angled in a first direction, illustrated with arrow 701 toward the flare cone 804 and then angled in a second direction illustrated with arrow 702 away from the flare cone 804. An inlet plenum 754 can be fluidly coupled to the third set of dilution openings 746 at the purge inlets 750. During operation compressed air (C) can flow through the third set of dilution openings 746 to first form an impingement flow (I). The impingement flow (I) can turn away from the fuel/air mixture outlet/dome inlet 796 and exhaust through the outlet 752 as a purged airflow (P).

Figure 15:
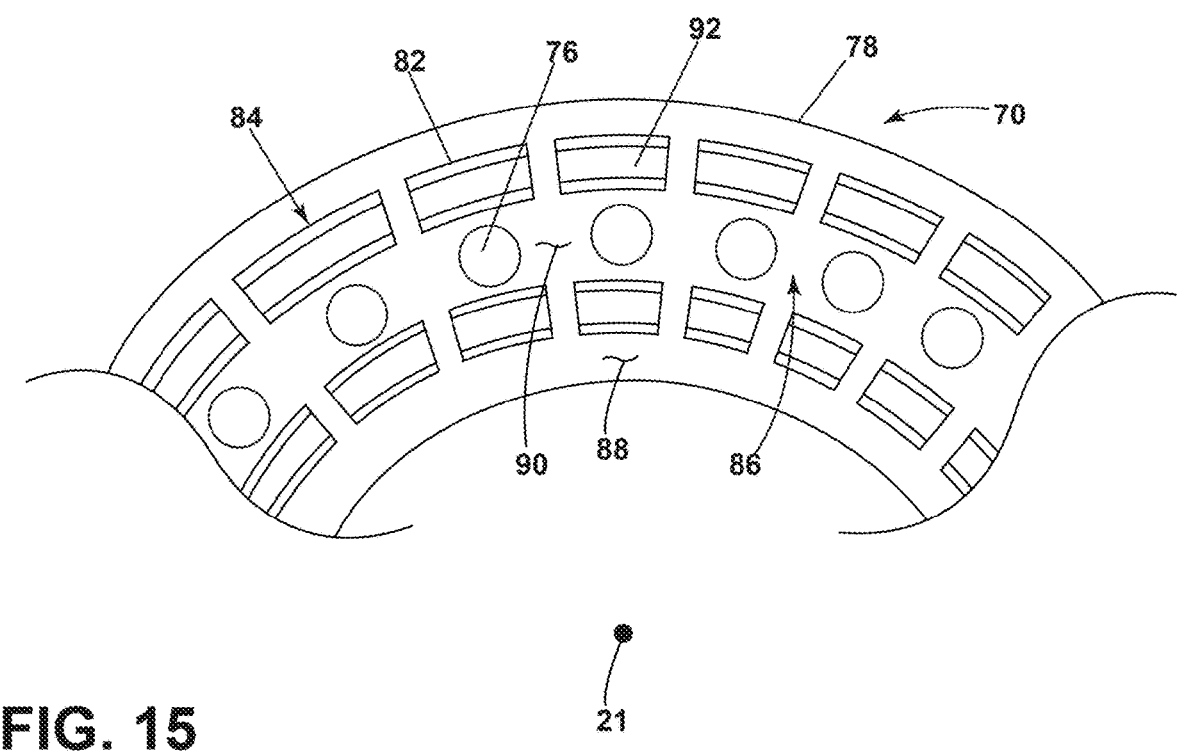
FIG. 15 a variation of a portion of the cross-section view from FIG. 2 according to another aspect of the disclosure herein.

Turning to FIG. 15 a variation of a portion of the cross-section view of a combustion section 70 within the gas turbine engine 10 is illustrated. In this variation the first set of dilution openings 92 can be segmented dilution openings, where the first set of dilution openings 92 are circumferentially disposed around the engine centerline 21 within the dome wall 90 in a segmented annulus as illustrated. Therefore, the vanes as described herein can also be disposed around the engine centerline 21 in a segmented arrangement.

Figure 16:
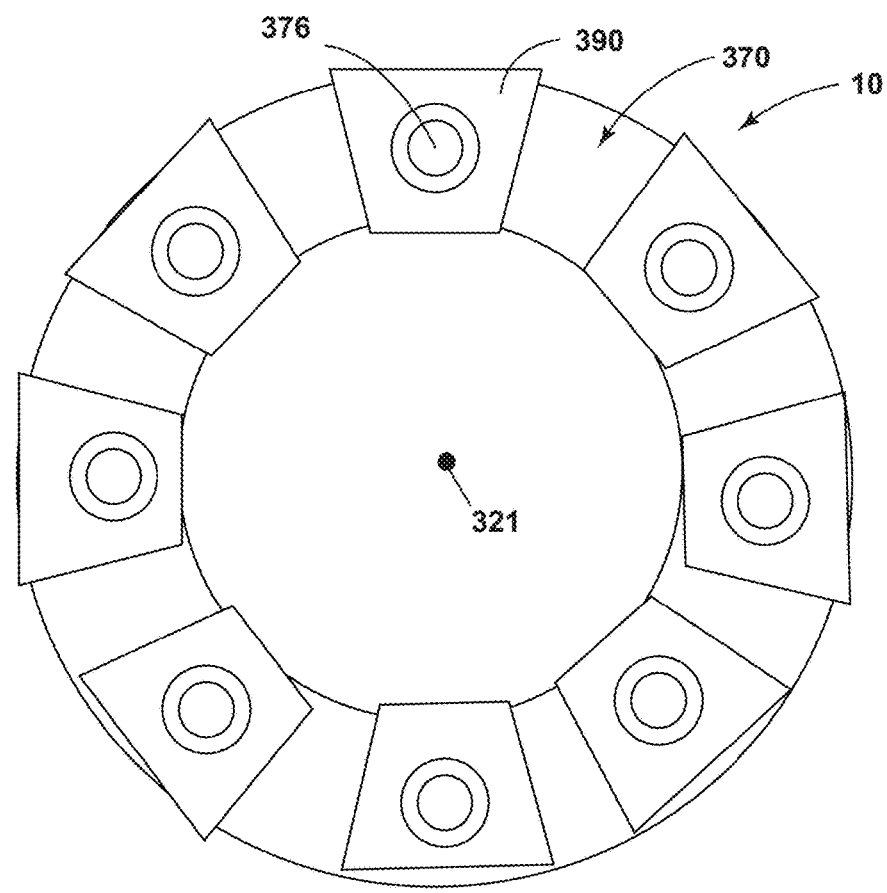
FIG. 16 is a schematic of a variation of the combustion section from FIG. 2 illustrating an arrangement of dome walls about the engine centerline.

FIG. 16 is a cross-sectional view of a combustion section 370, a variation of the combustion section 70 of FIG. 15, illustrating an arrangement of dome walls 390 about an engine centerline 321. Each of the dome walls described hereafter can include discrete dilution openings arranged about the engine centerline 321. This is a variation of the annular dilution openings illustrated in FIG. 2.

Figure 17:
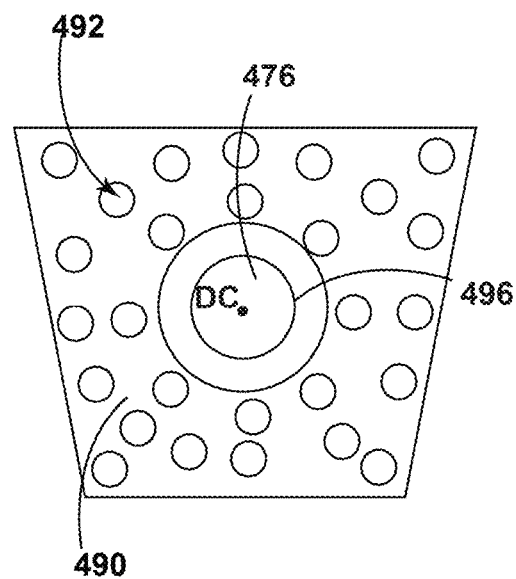
FIGS. 17-21 are a first, second, third, fourth, and fifth exemplary distributions for any of the first set of dilution openings described herein located within the dome walls as arranged in FIG. 16.

FIG. 17 is an exemplary distribution for the set of dilution openings 492 described herein and located within the dome wall 490 similarly to the arrangement in FIG. 16. While the first set of dilution openings 492 is numerically indicated, it should be understood that any of the sets of dilution openings described herein arranged in a circumferential array about the fuel/air mixture outlet/dome inlet 496 is contemplated.

Figure 18:
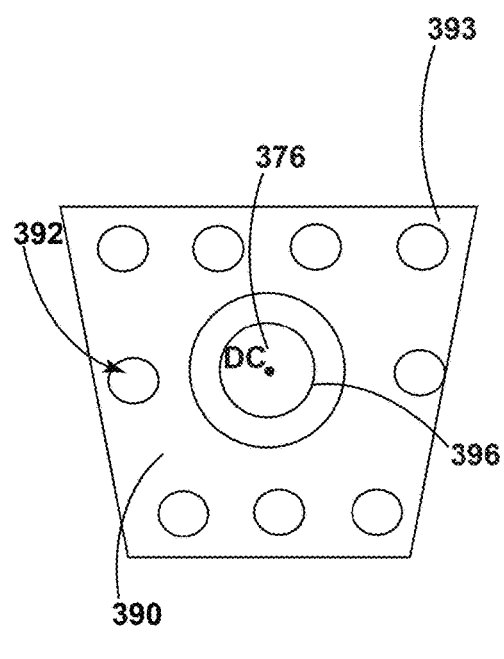

FIG. 18 is a second exemplary distribution for the set of dilution openings 392 described herein and located within the dome wall 390 as arranged in FIG. 16. While the first set of dilution openings 392 is numerically indicated, it should be understood that any of the sets of dilution openings described herein arranged about the fuel/air mixture outlet/dome inlet 396 is contemplated. In this particular arrangement, dilution openings are provided in corners 393 of the dome wall 390.

Figure 19:
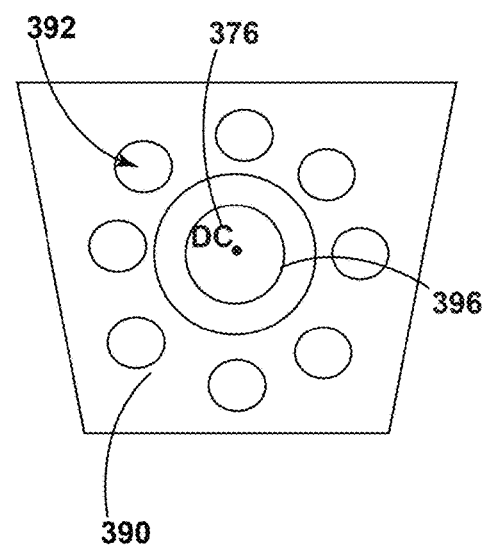

FIG. 19 is an exemplary distribution for the set of dilution openings 392 described herein and located within the dome wall 390 as arranged in FIG. 16. While the first set of dilution openings 392 is numerically indicated, it should be understood that any of the sets of dilution openings described herein arranged annularly about a fuel/air mixture outlet/dome inlet 396 for flame shaping and to prevent high temperature on the combustor liner 82 (FIG. 3).

Figure 20:
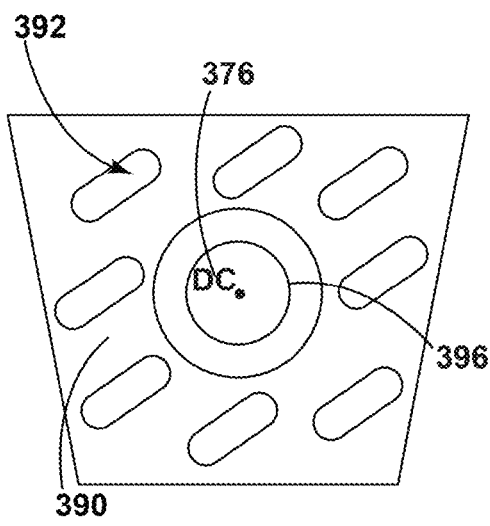

FIG. 20 is a third exemplary distribution for the set of dilution openings 392 described herein and located within the dome wall 390 as arranged in FIG. 16. While the first set of dilution openings 392 is numerically indicated, it should be understood that any of the sets of dilution openings described herein arranged about the fuel/air mixture outlet/dome inlet 396 is contemplated. In this particular arrangement, the dilution openings are slotted openings. The slotted openings can have any shape by way of non-limiting example race track, circular, or elliptical. Further the slotted openings can be oriented in any suitable manner by way of non-limiting example angled with respect to the radial direction as illustrated.

Figure 21:
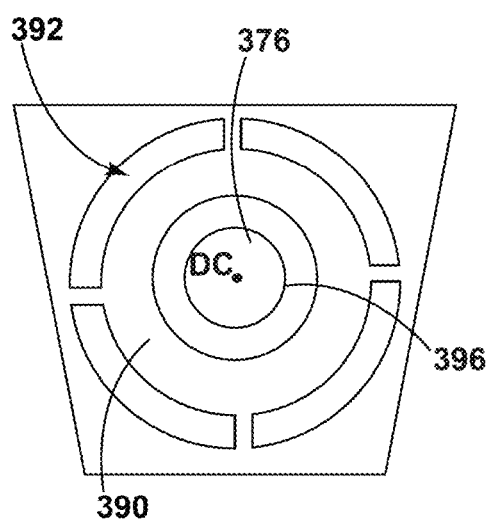

FIG. 21 is a fourth exemplary distribution for the set of dilution openings 392 described herein and located within the dome wall 390 as arranged in FIG. 16. While the first set of dilution openings 392 is numerically indicated, it should be understood that any of the sets of dilution openings described herein arranged about the fuel/air mixture outlet/dome inlet 396 is contemplated. The set of dilution openings 392 can be annular about the dome centerline (DC). In this particular arrangement, the set of dilution openings 392 are annular slotted openings arranged annularly about the fuel/air mixture outlet/dome inlet 396.

Any combination of the exemplary dome walls and variations of the dilution openings locations described herein are contemplated. FIGS. 4-21 are for illustrative purposes only and not meant to be limiting. The dilution holes/slotted openings can be in any form described herein. The deflector as described herein can be fed directly from under cowl region or implement a double pressure drop design. The compressed air as described herein can be a dilution flow with swirl that is generated by axial/radial flow vanes as described herein. It should be understood that the dilution flow as described herein can be arranged about a swirler axis or an engine axis. Each exemplary arrangement produces a dilution flow that is directed to keep hot gases away from the deflector and combustor liner by pushing hot gases away from walls such that mixing occurs away from the wall. The deflector as described herein can be cooled by back-side or film cooling or both.

It should be appreciated that the dilution openings as described herein are exemplary as illustrated. The dilution openings can be organized in a myriad of different ways, and can include by way of non-limiting example ribs, pin banks, circuits, sub-circuits, film-openings, plenums, mesh, and turbulators, of any shape or size. The dilution openings can include other flow enhancing devices, by way of non-limiting example a small opening located behind the dilution opening. It is further contemplated that the dilution openings can be part of a collection of dilution openings. It is also contemplated that the dilution openings can be in addition to and separate from a collection of cooling openings located along the combustor liner.

A method for controlling nitrogen oxides, or $NO_x$ present in combustion gases (G) within the combustor 80, includes injecting the dilution airflow (D) into the combustion chamber as described herein through the dilution openings located in the dome walls described herein at the angles described herein. The method can further includes injecting a purge flow (P) into the combustor as described herein.

Benefits associated with the combustor liner and methods described herein are uniform temperature distribution downstream of dilution openings which equates with better $NO_x$ and combustor exit temperature profile/pattern. A lower temperature on the deflector and liner equate with a better liner and deflector life. Further the dilution opening arrangements described herein enable control of the flame structure within the combustion chamber.

While described with respect to a gas turbine engine, it should be appreciated that the combustor as described herein can be for any engine with a having a combustor that emits $NO_x$. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine comprising a compressor section and a combustion section in serial flow arrangement along an engine centerline, the combustion section comprising a combustor liner; a dome wall coupled to the combustor liner, and a dome inlet located in the dome wall; a fuel injector fluidly coupled to the dome inlet; a combustion chamber fluidly coupled to the fuel injector and defined at least in part by the combustor liner and the dome wall; and at least one set of dilution openings located in the dome wall and fluidly coupled to the combustion chamber, the at least one set of dilution openings circumferentially arranged about the engine centerline.

The gas turbine engine of any preceding clause, wherein the at least one set of dilution openings is a first set of dilution openings and a second set of dilution openings concentric with respect to each other.

The gas turbine engine of any preceding clause, wherein at least one of the first and second set of dilution openings are annular dilution openings.

The gas turbine engine of any preceding clause, wherein at least one of the first and second set of dilution openings are segmented dilution openings.

The gas turbine engine of any preceding clause, wherein the at least one set of dilution openings extends between a dilution inlet and a dilution outlet at the dome wall.

The gas turbine engine of any preceding clause, further comprising at least one vane disposed within the at least one set of dilution openings between the dilution inlet and the dilution outlet.

The gas turbine engine of any preceding clause, wherein the at least one vane is one of a radial flow vane or an axial flow vane.

The gas turbine engine of any preceding clause, wherein the dome inlet defines a dome centerline and the at least one set of dilution openings defines a dilution centerline.

The gas turbine engine of any preceding clause, wherein the dilution centerline is a first centerline angled toward the longitudinal axis and intersecting with the dome centerline to define a dilution angle.

The gas turbine engine of any preceding clause, wherein the dome wall defines a conic portion forming an obtuse angle with the combustor liner and the dome wall extends radially between the fuel injector and the combustor liner to define a flat portion, wherein the flat portion and the conic portion meet at a first junction.

The gas turbine engine of any preceding clause, wherein the at least one set of dilution openings is located in the conic portion.

The gas turbine engine of any preceding clause, wherein the conic portion extends between the first junction and the combustor liner.

The gas turbine engine of any preceding clause, wherein the at least one set of dilution openings is located in the flat portion.

The gas turbine engine of any preceding clause, wherein the flat portion extends between the first junction and the combustor liner.

The gas turbine engine of any preceding clause, further comprising a flare cone disposed around the fuel injector, wherein the flare cone meets the flat portion at a second junction and wherein the flat portion extends between the first junction and the second junction.

The gas turbine engine of any preceding clause, further comprising a flare cone disposed around the fuel injector, wherein the flare cone meets the conic portion at a second junction and wherein the conic portion extends between the first junction and the second junction.

The gas turbine engine of any preceding clause, further comprising a flare cone disposed around the fuel injector and a purge passage disposed around the flare cone.

The gas turbine engine of any preceding clause, further comprising at least one axial deflector.

The gas turbine engine of any preceding clause, wherein the dome wall comprises a deflector and an impingement wall spaced apart to define an intermediate plenum.

The gas turbine engine of any preceding clause, wherein the at least one set of dilution openings are circumferentially disposed about the dome inlet.

What is claimed is:

1. A gas turbine engine comprising:
   a compressor section and a combustion section in serial flow arrangement along an engine centerline, the combustion section comprising:
   an annular dome wall circumscribing the engine centerline;
   an annular combustor liner extending from the annular dome wall to define an annular combustion chamber in combination with the annular dome wall;
   first and second annular dilution holes, concentrically arranged and radially spaced and formed in the annular dome wall to define an annular space between the first and second annular dilution holes; and
   multiple fuel injectors circumferentially spaced about the annular space between the first and second annular dilution holes.

2. The gas turbine engine of claim 1 wherein the annular dome wall is centered relative to the engine centerline.

3. The gas turbine engine of claim 1 wherein the annular space defines a dome wall centerline and at least one of the first and second annular dilution holes forms a flow path centerline forming an angle relative to the dome wall centerline.

4. The gas turbine engine of claim 3 further comprising a deflector extending from the annular dome wall and forming a non-orthogonal angle relative to the flow path centerline.

5. The gas turbine engine of claim 4 wherein the annular dome wall defines a conical portion that forms the deflector.

6. The gas turbine engine of claim 5 wherein the conical portion is located at least one of radially above or below the flow path centerline.

7. The gas turbine engine of claim 6 wherein the conical portion is located both radially above and below the flow path centerline.

8. The gas turbine engine of claim 6 wherein the at least one of the first and second annular dilution holes is formed in the conical portion.

9. The gas turbine engine of claim 8 wherein the annular dome wall comprises a planar portion and at least one fuel injector of the multiple fuel injectors is located on the planar portion.

10. The gas turbine engine of claim 9 wherein the planar portion and conical portion intersect.

11. The gas turbine engine of claim 10 wherein at least one of the annular dilution holes is located at the intersection.

12. The gas turbine engine of claim 5 wherein the annular dome wall has a flat and the flow path centerline emanates from the flat.

13. The gas turbine engine of claim 3 wherein a radial distance between the flow path centerline and the dome wall centerline increases in an aft direction relative to the engine centerline.

14. The gas turbine engine of claim 3 wherein a radial distance between the flow path centerline and the dome wall centerline decreases in an aft direction relative to the engine centerline.

15. The gas turbine engine of claim 3 wherein the first annular dilution hole forms a first centerline defining a first angle relative to the dome wall centerline, the second annular dilution hole forms a second centerline defining a second angle relative to the dome wall centerline, and the first and second angles are not the same.

16. The gas turbine engine of claim 15 wherein the first and second angles are equal in magnitude and opposite in sign.

17. The gas turbine engine of claim 15 wherein a radial distance between the dome wall centerline and both of the first and second centerlines increases in an aft direction.

18. The gas turbine engine of claim 15 wherein the first and second angles are inequal in magnitude.

19. The gas turbine engine of claim 15 wherein at least one of the multiple fuel injectors comprise a flare cone, which defines the dome wall centerline.

20. The gas turbine engine of claim 19 wherein the engine centerline is parallel to the dome wall centerline.

* * * * *